US008645635B2

(12) United States Patent
Bartlett et al.

(10) Patent No.: US 8,645,635 B2
(45) Date of Patent: Feb. 4, 2014

(54) METHOD AND APPARATUS FOR DETECTING AND PREEMPTIVELY AMELIORATING POTENTIAL LOGIC UNIT THRASHING IN A STORAGE SYSTEM HAVING MULTIPLE REQUESTERS

(75) Inventors: Eric John Bartlett, Salisbury (GB); Carlos Francisco Fuente, Portsmouth (GB); Nicholas Michael O'Rourke, Eastleigh (GB); William James Scales, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 1760 days.

(21) Appl. No.: 10/611,127

(22) Filed: Jul. 1, 2003

(65) Prior Publication Data

US 2004/0107305 A1    Jun. 3, 2004

(30) Foreign Application Priority Data

Nov. 29, 2002   (GB) .................................. 0227873.7

(51) Int. Cl.
*G06F 12/00*   (2006.01)
*G06F 13/00*   (2006.01)
*G06F 13/28*   (2006.01)

(52) U.S. Cl.
USPC ............................ 711/150; 711/151; 711/158

(58) Field of Classification Search
USPC .......................................... 711/150, 151, 158
See application file for complete search history.

(56) References Cited

U.S. PATENT DOCUMENTS

| | | | | |
|---|---|---|---|---|
| 5,644,700 A * | 7/1997 | Dickson et al. | ............... | 714/5.11 |
| 5,925,120 A * | 7/1999 | Arp et al. | ........................ | 710/314 |
| 5,933,824 A * | 8/1999 | DeKoning et al. | .................... | 1/1 |
| 6,038,681 A * | 3/2000 | Saegusa | ........................ | 714/6.21 |
| 6,219,727 B1 * | 4/2001 | Kailash et al. | .................... | 710/48 |
| 6,393,535 B1 * | 5/2002 | Burton et al. | ................... | 711/158 |
| 6,401,170 B1 * | 6/2002 | Griffith et al. | ................. | 711/114 |
| 6,457,098 B1 * | 9/2002 | DeKoning et al. | ............. | 711/114 |
| 6,980,510 B1 * | 12/2005 | Deitz et al. | ..................... | 370/217 |
| 7,171,434 B2 * | 1/2007 | Ibrahim et al. | ......................... | 1/1 |
| 2002/0188711 A1 * | 12/2002 | Meyer et al. | .................... | 709/223 |
| 2003/0126315 A1 * | 7/2003 | Tan et al. | ........................... | 710/1 |
| 2003/0159082 A1 * | 8/2003 | Brant et al. | ........................ | 714/5 |

* cited by examiner

*Primary Examiner* — Yaima Rigol
(74) *Attorney, Agent, or Firm* — Griffiths & Seaton PLLC

(57) ABSTRACT

A method and apparatus for detecting and preemptively ameliorating potential logic unit thrashing in a storage system having multiple I/O requesters is disclosed. In response to detecting that each of two requesters has usable access to both of the active-passive pair of controllers, one of the active-passive pair of controllers is selected to be designated as an active resource controller. In response to detecting that one of the two requesters has usable access to only one of the active-passive pair of controllers, only one of the active-passive pair of controllers is selected to be designated as an active resource controller. In response to detecting that each of the two requesters has usable access only to different ones of the active-passive pair of controllers, one of the active-passive pair of controllers is selected to be designated as an active resource controller.

16 Claims, 2 Drawing Sheets

METHOD AND APPARATUS FOR DETECTING AND PREEMPTIVELY AMELIORATING POTENTIAL LOGIC UNIT THRASHING IN A STORAGE SYSTEM HAVING MULTIPLE REQUESTERS

RELATED PATENT APPLICATION

The present patent application claims priority to co-pending Great Britain Application No. 0227873.7, filed on Nov. 29, 2002.

BACKGROUND OF THE INVENTION

1. Technical Field

The present invention relates to multi-requester storage systems in general, and in particular to multi-requester storage systems having Active/Passive paired storage controllers. Still more particularly, the present invention provides a method for detecting and preemptively applying ameliorative measures to potential logic unit thrashing in a multi-requester storage system having an Active/Passive paired storage controller.

2. Description of the Related Art

It is well-known in the field of computing to have controllers for controlling resources. In many computer systems, controllers are provided in pairs that can be switched, either to balance processing load or to provide some level of redundancy in the event of a controller failure. Also, resources are presented to host applications and system software in a logical rather than a physical representation. For example, storage controllers may control storage disks to position data representing what a user sees as a "real" disk drive in some scattered form on the surfaces of several disks, perhaps to optimize the use of the disk surfaces or to optimize the time taken to seek the data. To the user, such scattering is invisible, as the representation to user programs is as a logical unit having a disk, such as a "C-drive" on a typical personal computer. One example of such a resource controller system is a system comprising a pair of storage controllers that present disk storage to input/output (I/O) requesters in the form of logical units (LUNs).

Most Redundant Array of Independent Disk (RAID) controllers operate in pairs, each presenting an image of the same set of RAID arrays (or partitions of RAID arrays) made out of storage shared by both RAID controllers. If one of the RAID controllers fails, the RAID arrays are still accessible to requesters via the other controller and thus there is no single point of failure. The implementations of such RAID controllers can be split into two categories. Some RAID controllers are classed as Active-Active and allow simultaneous access to the same RAID array via either controller in the pair with no or virtually no degradation in performance. Other RAID controllers are classified as Active-Passive and allow only one controller to access a particular RAID array (or sometimes a partition of the RAID array) at a time. Some Active-Passive controllers require a particular sequence of commands to be issued to change which controller is active, while other controllers will automatically attempt to swap which controller is active depending on which controller receives I/O requests.

Allowing a single requester system to access storage presented by an Active-Passive pair of controllers is relatively straightforward. There are many implementations of software that can be used in the requester system for detecting the presence of an active controller and a passive controller, both presenting the same storage and present these controllers as a single storage device, or LUN, to the requester. Such software is also responsible for detecting when there is a problem in completing I/O requests via the active controller and performing the necessary tasks to make the other controller active—automatically failing over to use the other controller without actually failing an I/O request back up to higher levels of software executing on the requester system.

However, there is a problem when multiple requester systems share storage that is presented by an Active-Passive pair of controllers, namely, that all the requesters must agree which controller is active and must coordinate when to change the active controller. Otherwise, a condition known as "LUN thrashing" occurs. In such a condition, different requesters attempt to make a different controller the active controller of the pair. The result is that the role of active controller repeatedly swaps and as the time to swap the active controller is usually orders of magnitude longer than the time to process an I/O request, the result is a dramatic drop in the rate at which the controllers can process I/O. This result of LUN thrashing can present a serious performance problem, especially in large and complex, enterprise-level, storage systems, such as storage-area networks (SANs).

Until recently, it has not been necessary for multiple requesters to directly access the same storage and thus the problem has not been previously addressed. However, as new direct access shared file systems (such as the IBM® Storage Tank), clustered storage appliances (such as IBM® 2145 Total Storage Virtualization Engine) and other SAN-based virtualization solutions become more common, the requirement for multi-requester access to storage has come into existence.

One solution to avoid the problem of LUN thrashing altogether is to use Active-Active RAID controllers. However, Active-Active controllers are more expensive and do not allow SAN-based virtualization solutions to work with existing Active-Passive RAID controllers.

A second solution to avoid the problem of LUN thrashing in storage systems having multiple requesters is to allow only one requester to have direct access to a particular LUN or RAID array and all I/O requests from other requesters are forwarded to that requester. This is effectively what network file systems such as NFS do. However, there is a significant performance penalty in forwarding all I/O requests from other requesters to a single requester. Again, this solution does not help in SAN-based virtualization systems.

A third solution is to allow RAID controllers themselves to control which controller will be active and which controller will be passive. The disadvantage of this solution is that if both RAID controllers are functional but not all requesters can communicate with both RAID controllers because of a problem at the SAN level, the controllers may make the wrong decision as to which controller should be active and thus introducing a single point of failure.

Consequently, it would be desirable to provide an improved method for detecting potential LUN thrashing in a multi-requester storage system having Active/Passive paired storage controllers, and preemptively applying ameliorative measures.

SUMMARY OF THE INVENTION

In accordance with a preferred embodiment of the present invention, in response to detecting that each of two requesters has usable access to both of the active-passive pair of controllers, one of the active-passive pair of controllers is selected to be designated as an active resource controller. In response to detecting that one of the two requesters has usable access to only one of the active-passive pair of controllers, only one of the active-passive pair of controllers is selected to be designated as an active resource controller. In response to detecting that each of the two requesters has usable access only to different ones of the active-passive pair of controllers, one of the active-passive pair of controllers is selected to be designated as an active resource controller, and I/O requests from only that one of the two I/O requesters that has usable access to the one of the active-passive pair of controllers designated as an active resource controller is enabled or I/O requests to swap a passive to an active one of the active-passive pair of controllers from only that one of the two I/O requesters that has usable access to the one of the active-passive pair of controllers designated as an active resource controller is enabled.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
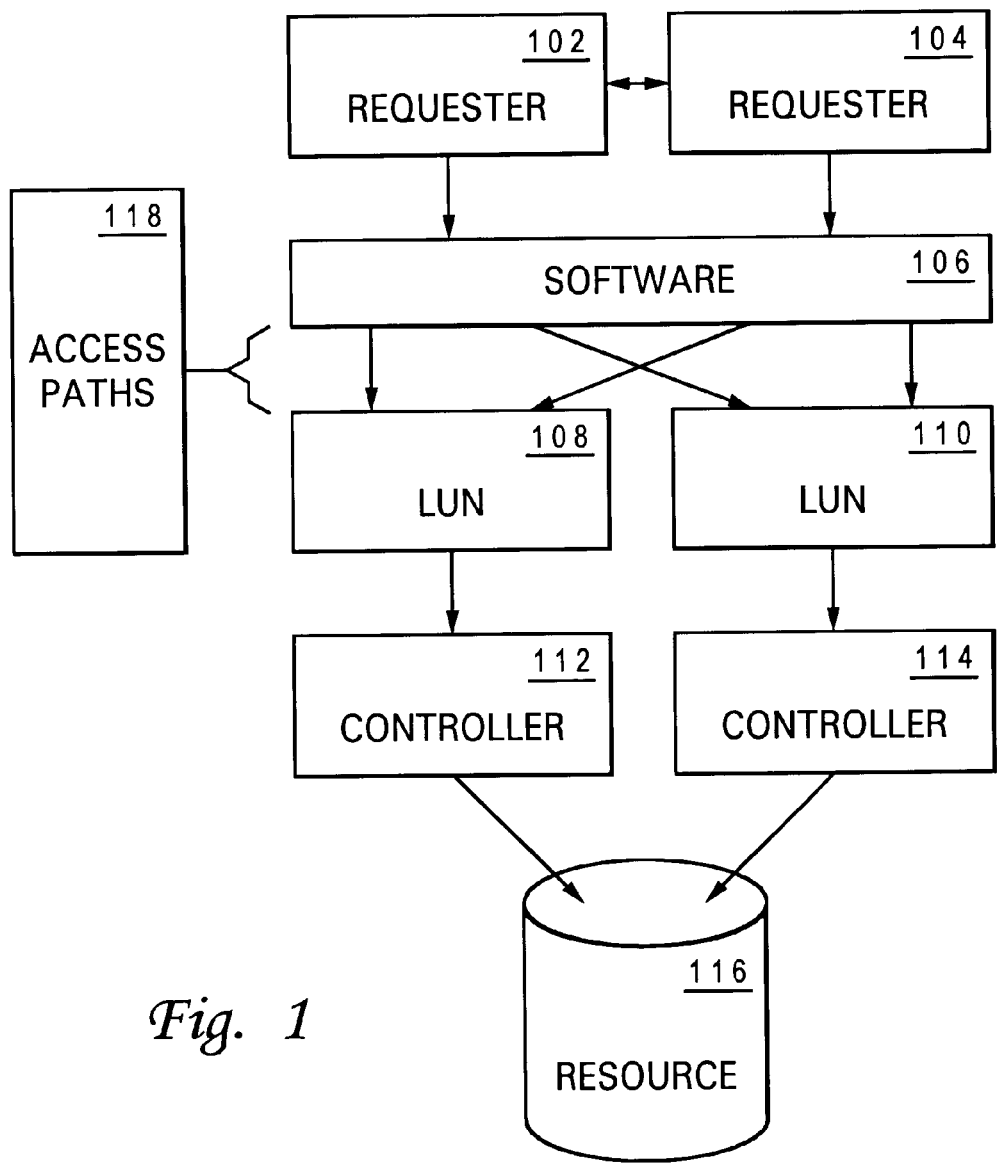
FIG. 1 is a block diagram of a multi-requester storage system, in accordance with a preferred embodiment of the present invention.

Referring now to the drawings and in particular to FIG. 1, there is illustrated a block diagram of a multi-requester storage system, in accordance with a preferred embodiment of the present invention. As shown, a pair of requesters 102, 104 is connected to software 106 that is operable to present logic units (LUNs) 108, 110 representing the same storage across access paths 118. It should be noted that LUNs 108, 110 have no independent existence but are merely representations of storage, in this case, the same storage, presented by controllers 112, 114 to requesters 102, 104. All the available access paths are shown such that requesters 102 and 104 are able to access either one of LUNs 108, 110. This is not always the case, as will be described below.

LUNs 108, 110 are presented to software 106 for onward presentation to requesters 102, 104 by controllers 112, 114, which form an Active-Passive pair to control a resource 116. Resource 116 is preferably a Redundant Array of Independent Disk (RAID) or a partition of a RAID.

In accordance with a preferred embodiment of the present invention, requesters 102, 104, which may be hosts or other systems capable of initiating input/output (I/O), are able to communicate with each other using any conventional network or clustering technology. When either one of requesters 102, 104 initializes, it must determine whether it can communicate with both controllers 112, 114 and then communicate such information with other requester systems that are using controllers 112, 114. Requesters 102, 104 can then make a collective decision based on the information gathered from requesters 102, 104, as follows.

If both requesters 102, 104 can communicate with both controllers 112, 114, requesters 102, 104 can collectively decide which one of controllers 112, 114 will be the active controller and all requesters can issue I/O requests to that controller. If a pair of RAID controllers presents multiple RAIDs or LUNs, the requesters can collectively decide to make one controller active for some of the LUNs and the other controller active for the other LUNs in order to balance the I/O workload between controllers 112 and 114.

If one or both of requesters 102, 104 cannot communicate with one of controllers 112, 114, or either one or both of controllers 112, 114 is unable to service I/O requests for some other reason, requesters 102, 104 can collectively make the decision not to attempt to use that controller.

If one of requesters 102, 104 cannot communicate with one of controllers 112, 114 and the other requester cannot communicate with the other controller, requesters 102, 104 cannot use a particular RAID or LUN without causing LUN thrashing. In such a case, the simplest solution is to deny access to one requester, although an alternative can be implemented that would allow both requesters to use the storage while keeping LUN thrashing to an acceptable minimum. For example, one requester can be permitted to access the storage, but not to influence the decision as to which controller is active.

If during operation, one of controllers 112, 114 fails or for some other reason one of requesters 102, 104 is unable to issue I/O requests to a particular controller, the requester can request that the requesters reevaluate which controller to use. It is important that if, as a result of the reevaluation, the decision is made to swap which controller is active, all I/O requests to that controller are quiesced prior to making the swap. The quiesce ensures that when the active controller is changed that no further I/O request will be issued to the controller that has become passive in order to avoid LUN thrashing occurring during the change over period.

Similarly, if a requester that can not communicate with both controllers 112, 114 subsequently (probably because of some service action) determines that it can now communicate with a controller, this should be communicated so that the requesters can reevaluate which controller to use as the active controller.

If a requester 102, 104 cannot communicate with the other requester or, in a system comprising more than two requesters, with a majority of the other requesters which are sharing a pair of controllers, it cannot know which controller has been chosen as the active controller. Again, the simplest solution is to deny access to the storage by that requester. However, in an alternative implementation, it may also be possible to permit the requester to use the storage but not to influence which controller is active.

Figure 2:
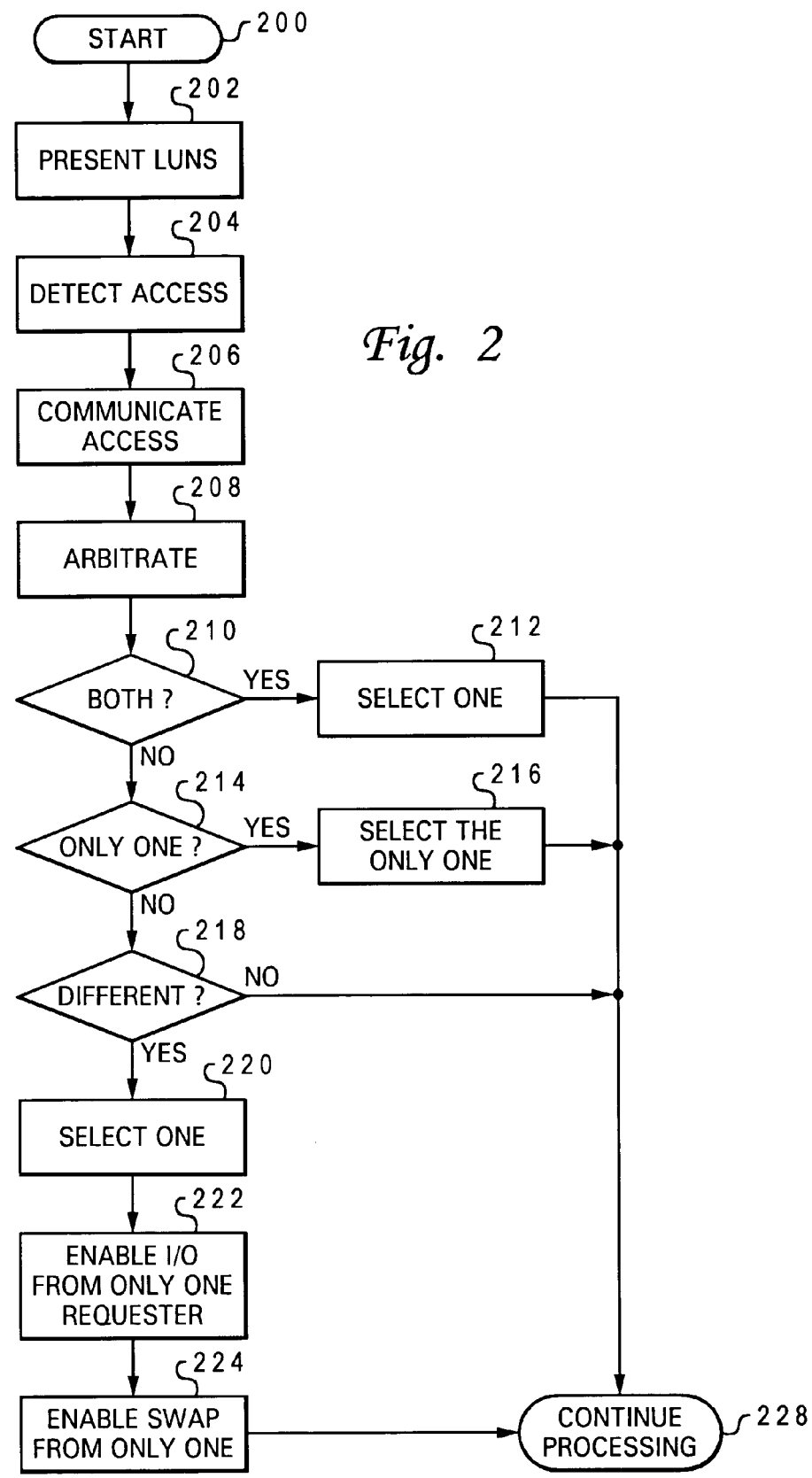
FIG. 2 is a high-level logic flow diagram of a method for detecting and preemptively ameliorating potential logic unit thrashing in a storage system having at least two I/O requesters, in accordance with a preferred embodiment of the present invention.

With reference now to FIG. 2, there is depicted a high-level logic flow diagram of a method for detecting and preemptively ameliorating potential LUN thrashing in a storage system having at least two I/O requesters, in accordance with a preferred embodiment of the present invention. The process begins at step 200, which is either at system initialization or at a reinitialization caused by, for example, a change in the status of a requester or a controller. At step 202, controllers (such as controllers 112, 114 from FIG. 1) present resources as logical units to I/O requesters (such as requesters 102, 104 from FIG. 1). At step 204, each of the I/O requesters detects whether it has usable access to one or more of the controllers. At step 206, each of the I/O requesters communicates its access state to the other I/O requester. At step 208, each of the I/O requesters participates in arbitration to determine which of the Active-Passive pair of resource controllers is to be designated as the active controller. The outcome of the arbitration is determined at testing steps 210, 214, 218.

If, at step 210, each of the I/O requesters has usable access to both of the Active-Passive pair of the controllers, the I/O requesters select one of the Active-Passive pair of the controllers to be designated as an active controller, at step 212.

If, at step 214, one or both of the I/Q requesters has usable access to only one of the Active-Passive pair of the controllers, the I/O requesters select the only one of the Active-Passive pair of the controllers to be designated as the active resource controller, at step 216.

If, at step 218, each of the I/O requesters has usable access only to different ones of the Active-Passive pair of the controllers, the I/O requesters select one of the Active-Passive pair of the controllers to be designated as an active resource controller, at step 220, and also perform at least one of the following:

At step 222, enabling I/O requests from only that I/O requester that has usable access to that resource controller designated as an active resource controller; and At step 224, enabling requests to swap a passive to an active resource controller from only the I/O requester that has usable access to the resource controller designated as an active resource controller.

Processing continues at step 228, which may be continued normal processing after the arbitration and selection steps described above, or may be error processing if the arbitration and selection steps produced no usable outcome. Such error processing is well-known in the art.

The message passing between requesters that is necessary to the preferred embodiment of the present invention is implemented using one of the known networking or clustering techniques of the art to allow I/O the requesters to communicate with each other.

As has been described, the present invention provides an improved method and apparatus for detecting potential LUN thrashing in a multi-requester storage system having Active-Passive pair storage controllers, and preemptively applying ameliorative measures.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for arbitrating a selection of an active storage controller in a multi-requester storage system including an active-passive pair of storage controllers coupled to a plurality of logic units (LUNs) to avoid potential logic unit thrashing occurring as a result of input/output requests sent to said active storage controller during a change over period in which said active storage controller is swapped for a passive storage controller, said method comprising:

in response to a detection that each of a first requester and a second requester has usable access to both a first storage controller and a second storage controller of said active-passive pair of storage controllers:
collectively selecting, via arbitration by said first and second requesters, said first storage controller as said active storage controller and said second storage controller as said passive storage controller for a first portion of logic units (LUNs) and said second storage controller as said active storage controller and said first storage controller as said passive storage controller for a second portion of LUNs;

in response to a detection that said first requester and said second requester both have usable access to only said first storage controller:
communicating to said first requester, by said second requester, that said second requester only has usable access to said first storage controller,
communicating to said second requester, by said first requester, that said first requester only has usable access to said first storage controller, and
collectively selecting said first storage controller as said active storage controller by said first and second requesters; and in response to a detection that said first requester has usable access only to said first storage controller and said second requester has usable access only to said second storage controller:
communicating to said second requester, by said first requester, that said first requester only has usable access to said first storage controller,
communicating to said first requester, by said second requester, that said second requester only has usable access to said second storage controller,
enabling only one of said first requester and said second requester to select which of said first and second storage controllers as said active storage controller, and
selecting, by said enabled first requester or second requester, said first storage controller or said second storage controller as said active storage controller.

2. The method of claim 1, wherein said in response to said detection that said first requester has usable access only to said first storage controller and said second requester has usable access only to said second controller further includes enabling input/output (I/O) requests from only said enabled first requester or said second requester.

3. The method of claim 1, wherein said in response to said detection that said first requester has usable access only to said first storage controller and said second requester has usable access only to said second controller further includes enabling input/output (I/O) requests to swap a passive storage controller to said active storage controller from said non-enabled first requester or said second requester.

4. The method of claim 1, wherein said first requester has usable access only to said first storage controller and said second requester has usable access only to said second storage controller, said method further comprising allowing a non-enabled one said first requester and said second requester to access said first storage controller or said second storage controller selected as said active storage controller.

5. A computer-usable memory embodying computer program product for arbitrating a selection of an active storage controller in a multi-requester storage system including an active-passive pair of storage controllers coupled to a plurality of logic units (LUNs) to avoid potential logic unit thrashing occurring as a result of input/output requests sent to said active storage controller during a change over period in which said active storage controller is swapped for a passive storage controller, said computer-usable medium comprising:

program code means for collectively selecting, via arbitration by said first and second requesters, said first storage controller as said active storage controller and said second storage controller as said passive storage controller for a first portion of logic units (LUNs) and said second storage controller as said active storage controller and said first storage controller as said passive storage controller for a second portion of LUNs in response to a detection that each of said first requester and said second requester have usable access to both said first storage controller and said second storage controller of said active-passive pair of storage controllers;

program code means for communicating to said first requester, by said second requester, that said second requester only has usable access to said first storage controller;

program code means for communicating to said second requester, by said first requester, that said first requester only has usable access to said first storage controller and collectively selecting, by said first and second requesters, said first storage controller as said active storage controller in response to a detection that said first requester and said second requester both have usable access to only said first storage controller; and program code means for communicating to said second requester, by said first requester, that said first requester only has usable access to said first storage controller, communicating to said first requester, by said second requester, that said second requester only has usable access to said second storage controller, enabling only one of said first requester and said second requester to select which of said first and second storage controllers as said active storage controller, and selecting, by said enabled first requester or second requester, said first storage controller or said second storage controller as said active storage controller in response to a detection that said first requester has usable access only to said first storage controller and said second requester has usable access only to said second storage controller.

6. The computer-usable memory of claim 5, wherein said program code means that responds said detection that said first requester has usable access only to said first storage controller and said second requester has usable access only to said second storage controller further includes program code means for enabling input/output (I/O) requests from only said enabled first requester or said second requester.

7. The computer-usable memory of claim 5, wherein said program code means that responds said detection that said first requester has usable access only to said first storage controller and said second requester has usable access only to said second storage controller further includes program code means for enabling input/output (I/O) requests to swap a passive storage controller to said active storage controller from said non-enabled first requester or said second requester.

8. The computer-usable memory of claim 5, wherein said first requester has usable access only to said first storage controller and said second requester has usable access only to said second storage controller, said computer-usable medium further comprising computer code means for allowing a non-enabled one said first requester and said second requester to access said first storage controller or said second storage controller selected as said active storage controller.

9. An apparatus for arbitrating a selection of an active storage controller in a multi-requester storage system including an active-passive pair of storage controllers coupled to a plurality of logic units (LUNs) to avoid potential logic unit thrashing occurring as a result of input/output requests sent to said active storage controller during a change over period in which said active storage controller is swapped for a passive storage controller, said apparatus comprising:

means for collectively selecting, via arbitration, said first storage controller as said active storage controller and said second storage controller as said passive storage controller for a first portion of logic units (LUNs) and said second storage controller as said active storage controller and said first storage controller as said passive storage controller for a second portion of LUNs in response to a detection that each of a first requester and a second requester has usable access to both of said first and second storage controllers;

means for communicating to said first requester, by said second requester, that said second requester only has usable access to said first storage controller;

means for communicating to said second requester, by said first requester, that said first requester only has usable access to said first storage controller;

means for collectively selecting said first storage controller as said active storage controller in response to a detection that said first requester and said second requester both have usable access to only said first storage controller;

means for communicating to said second requester, by said first requester, that said first requester only has usable access to said first storage controller, communicating to said first requester, by said second requester, that said second requester only has usable access to said second storage controller, enabling only one of said first requester and said second requester to select which of said first and second storage controllers as said active storage controller; and means for selecting, by said enabled first requester or second requester, said first storage controller or said second storage controller as said active storage controller in response to a detection that said first requester has usable access only to said first storage controller and said second requester has usable access only to said second storage controller.

10. The apparatus of claim 9, wherein said means for responding to said detection that said first requester has usable access only to said first storage controller and said second requester has usable access only to said second storage controller further includes means for enabling input/output (I/O) requests from only said enabled first requester or said second requester.

11. The apparatus of claim 9, wherein said means for responding to said detection that said first requester has usable access only to said first storage controller and said second requester has usable access only to said second storage controller further includes means for enabling input/output (I/O) requests to swap a passive storage controller to said active storage controller from said non-enabled first requester or said second requester.

12. The apparatus of claim 9, wherein said active-passive pair of storage controllers are implemented in a storage attached network (SAN).

13. The apparatus of claim 9, wherein said active-passive pair of storage controllers are implemented in a storage attached network (SAN)-based storage virtualization environment.

14. The apparatus of claim 9, wherein said active-passive pair of storage controllers are implemented as part of a storage tank system.

15. The apparatus of claim 9, wherein said active-passive pair of storage controllers further include redundant array of independent disks (RAID) storage controllers.

16. The apparatus of claim 9, wherein said first requester has usable access only to said first storage controller and said second requester has usable access only to said second storage controller, said apparatus further comprising means for allowing a non-enabled one said first requester and said second requester to access said first storage controller or said second storage controller selected as said active storage controller.

* * * * *